United States Patent Office 3,560,299
Patented Feb. 2, 1971

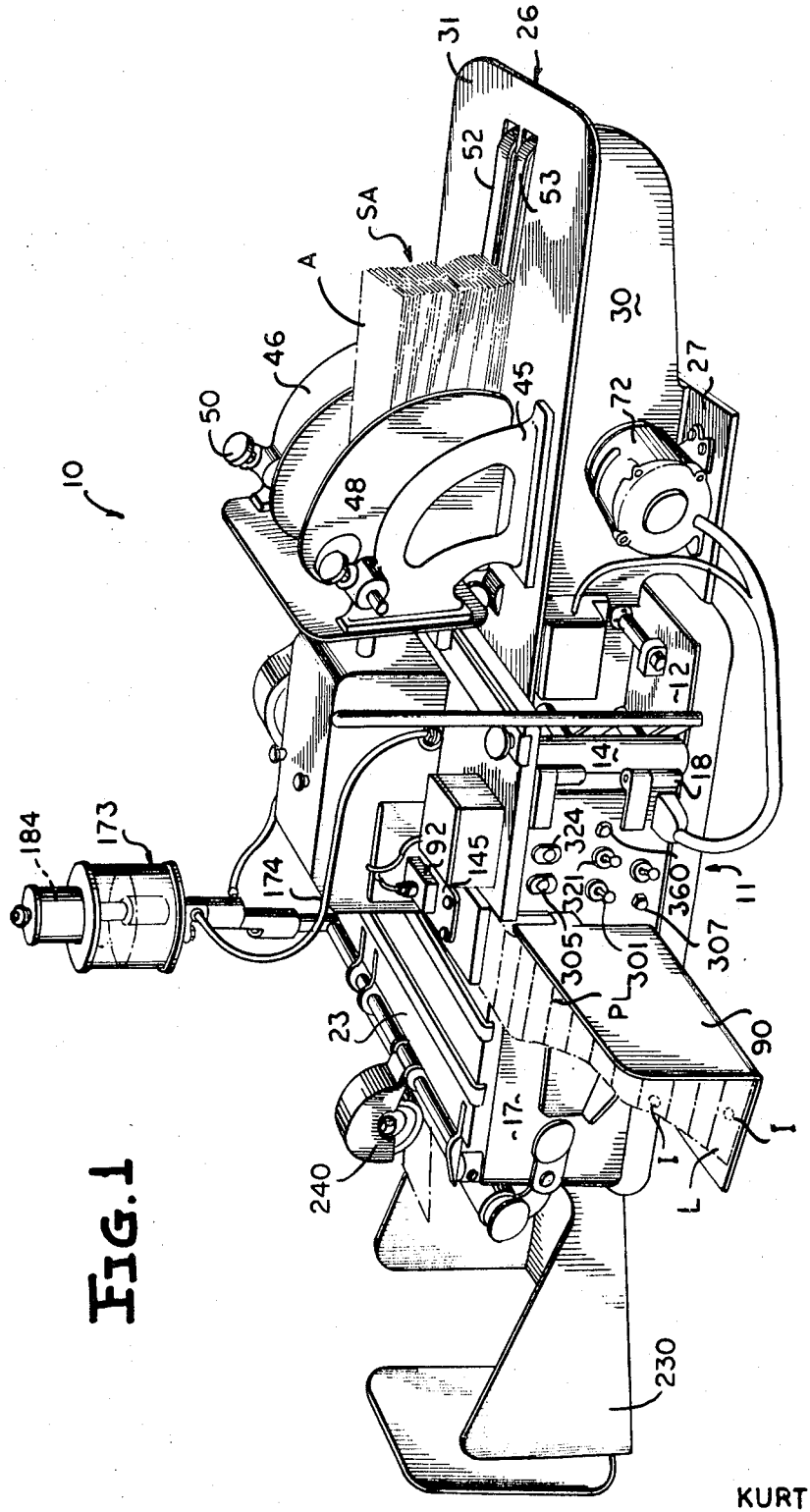

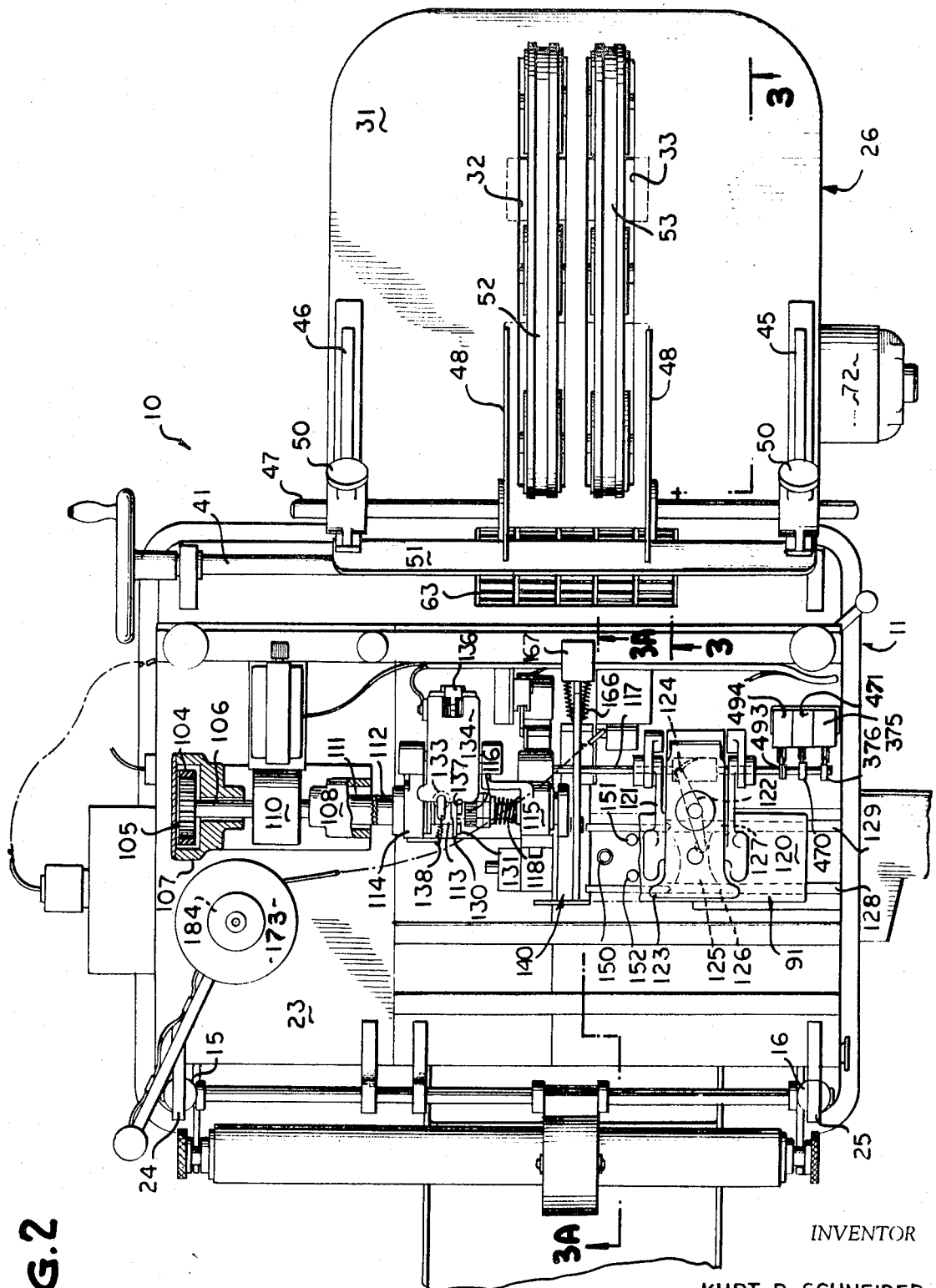

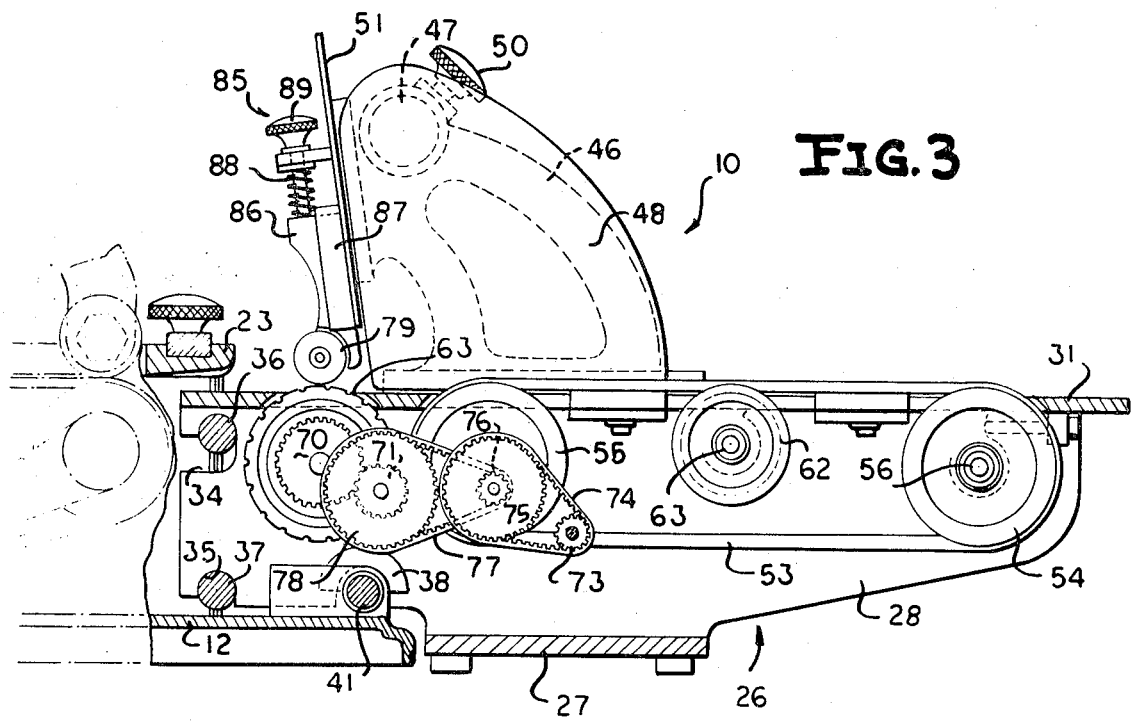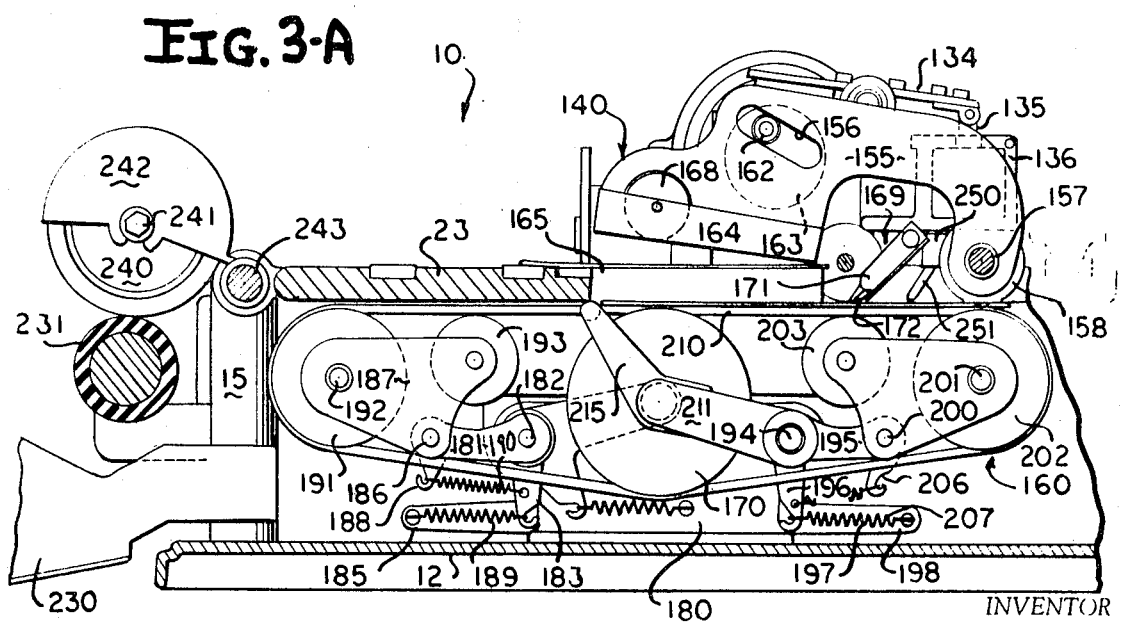

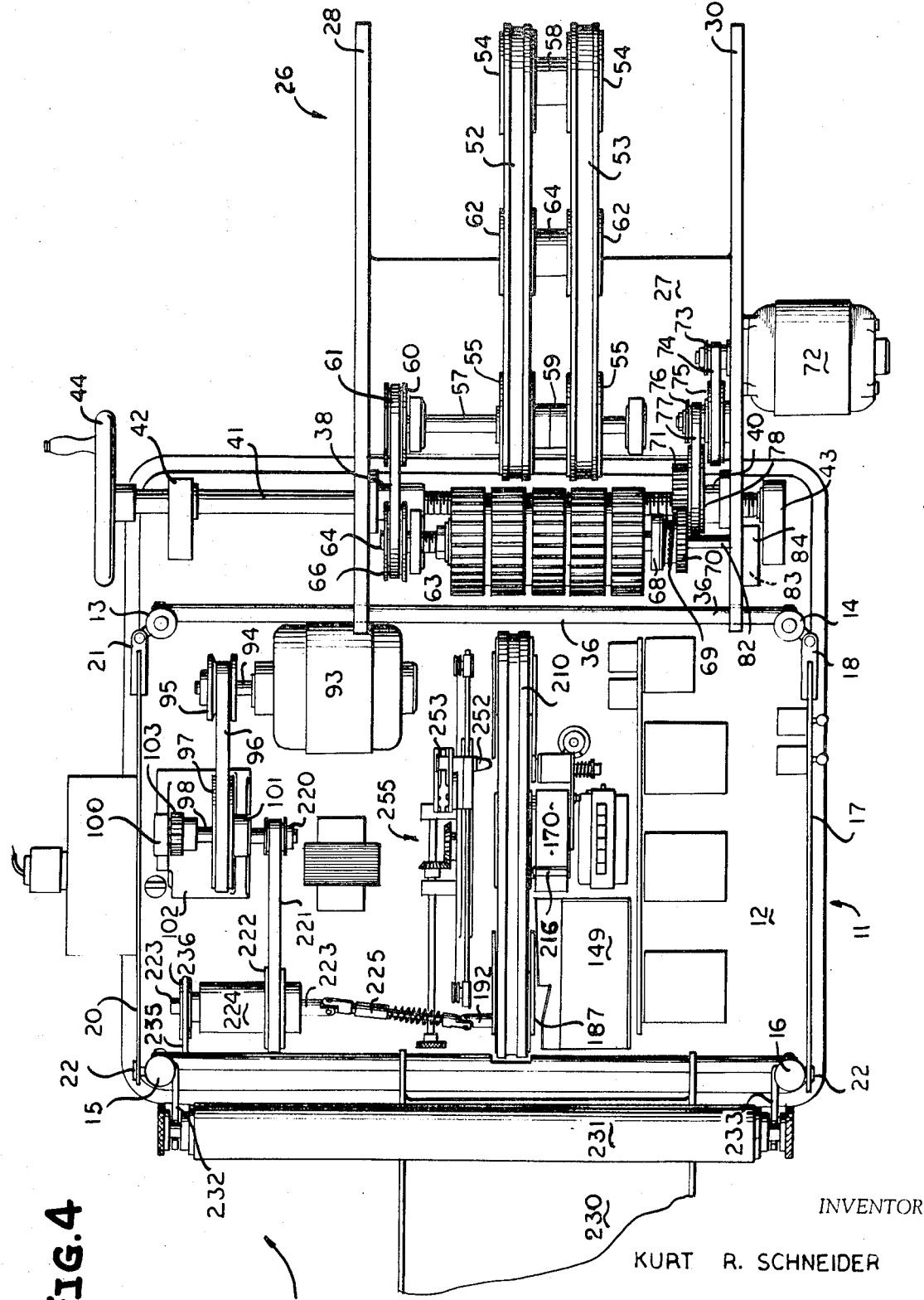

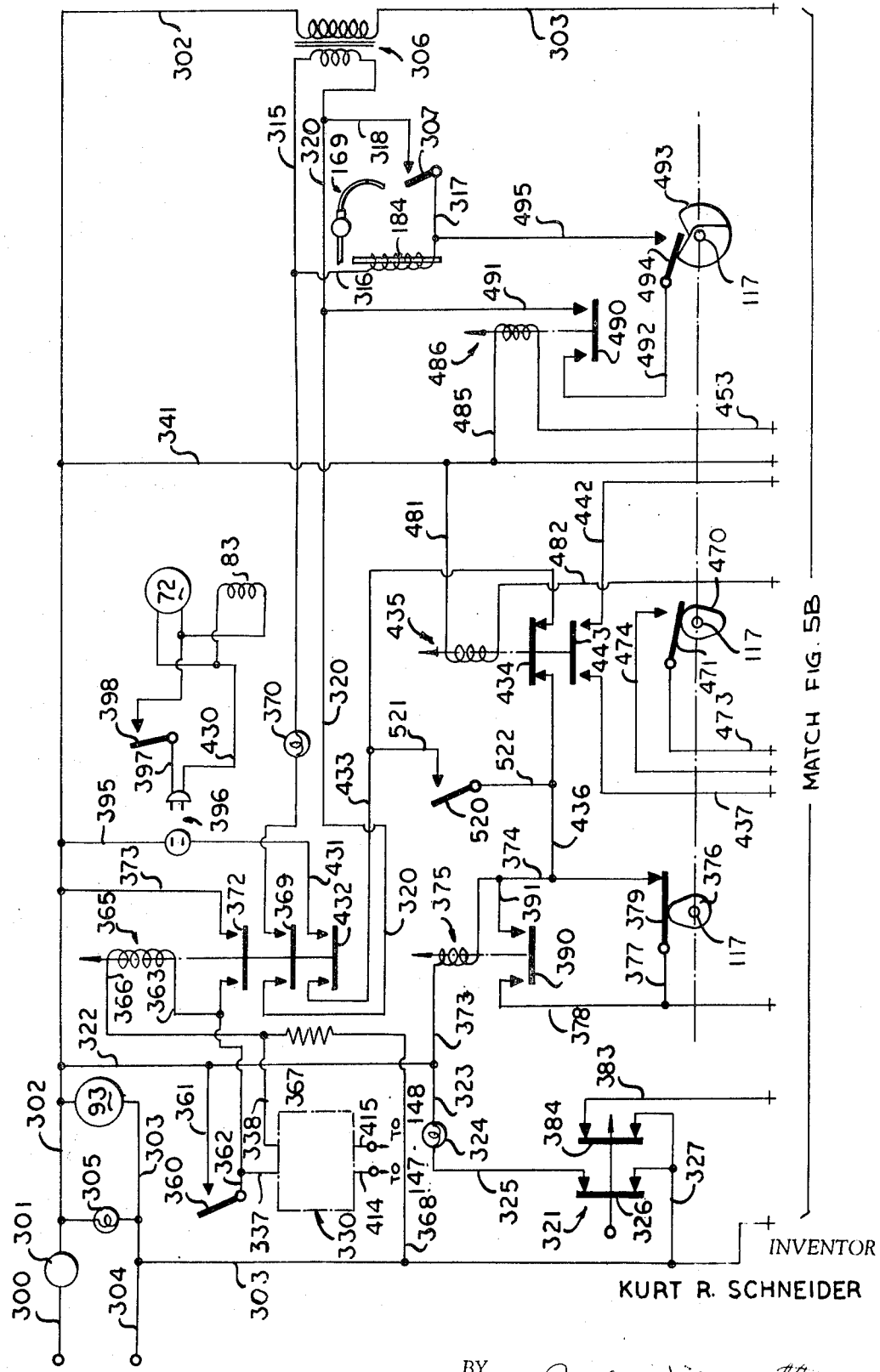

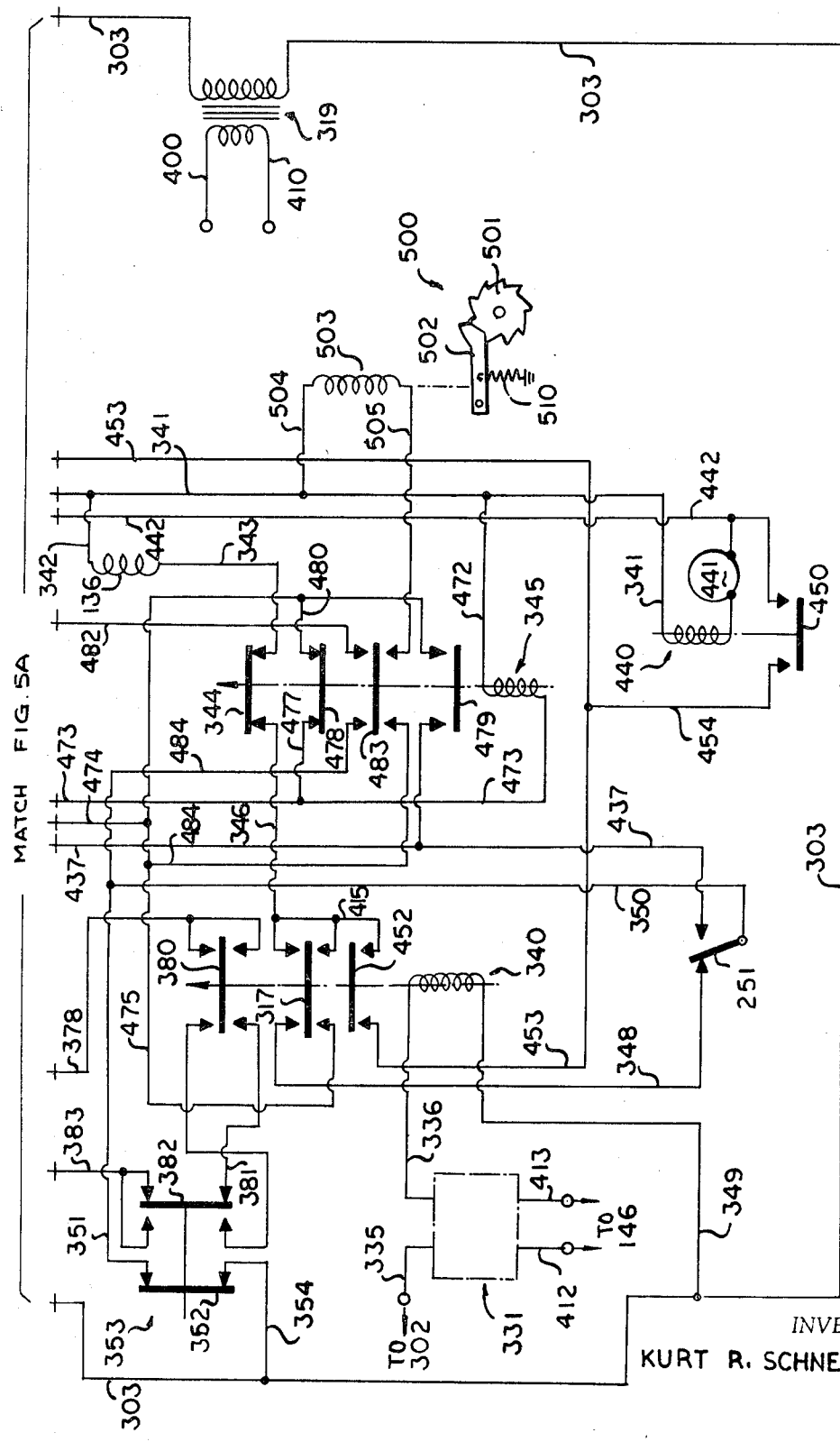

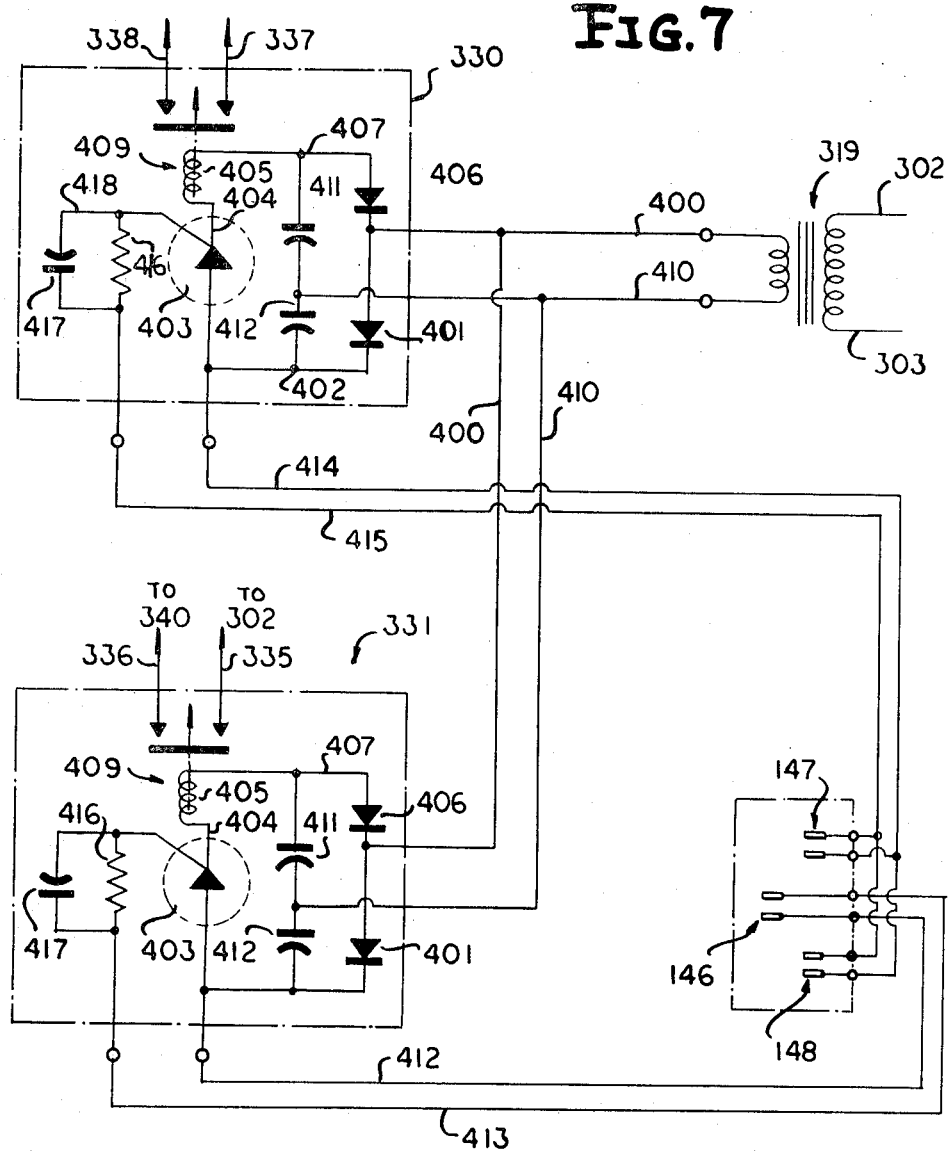
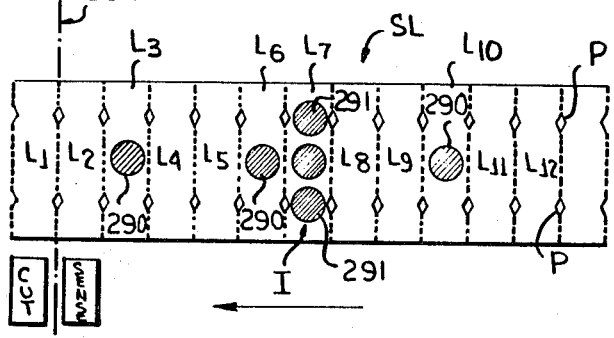

3,560,299
LABELLING MACHINE
Kurt R. Schneider, Bainbridge, N.Y., assignor to Litton
Business Systems, Inc., a corporation of New York
Filed Dec. 24, 1964, Ser. No. 420,912
Int. Cl. B32b 31/12; B65c 1/02, 9/44
U.S. Cl. 156—351                                    11 Claims

ABSTRACT OF THE DISCLOSURE

A machine for associating first articles moving along a first path with second articles moving along a second path; the two paths intersecting at a common zone. Drive means are provided for moving the articles along their respective paths under the control of control circuitry and a sensing mechanism responsive to the sensing of indicia disposed on the second articles. The sensing of a first form of indicia arrests the feed of first articles while permitting the feed of second articles while the sensing of a second form of indicia arrests the feed of both first and second articles.

BACKGROUND OF THE INVENTION

This invention relates to a novel apparatus for applying labels to successive moving articles, and is particularly directed to a machine for automatically applying pre-addressed labels to individual items of mailing matter such as postcards, empty or stuffed envelopes, and other shipments which are to be sent to selected groups of addressees.

A primary object of this invention is to provide a novel labelling machine which includes various detecting devices forming portions of a circuit system which is cooperative with various components of the machine for performing such various operations as automatically feeding and applying "proper" labels to articles, interrupting the feeding of the articles upon the detection of an "improper" label, discharging such "improper" labels prior to reactivating the feeding of additional articles, and preventing both labels and articles being fed in response to the detection of a "zoned" label resulting in the automatic stopage of the machine.

A further object of this invention is to provide in a novel labelling machine of the type described, a novel mechanism for moistening a predetermined area of the envelopes upon which the labels are to be applied, means for activating the moistening mechanism in response to the detection of an envelope being fed through the machine, and the moistening mechanism including means for preventing the application of moisture to any area of the envelope other than the preselected area.

A further object of this invention is to provide a novel labelling manhine of the type described including means for bottom-feeding individual envelopes successively from a stack of envelopes toward a zone at which labels fed by a second feeding means are united with the envelopes, the first feed means including means for preventing the double-feeding of envelopes by the positive stoppage of the envelope feed means after each envelope is fed a predetermined distance toward the uniting zone.

With the above, and other objects in view that will hereinafter appear, the nature of the invention will be more clearly understood by reference to the following detailed description, the appended claims and the several views illustrated in the accompanying drawings:

In the drawings:

FIG. 1 is a perspective view of the novel labelling machine of this invention, and illustrates labels and envelopes being fed along respective predetermined paths generally normal to each other toward a label applying zone, and a labelled envelope being discharged into a hopper.

FIG. 2 is an enlarged fragmentary top plan view of the labelling machine of FIG. 1, and more clearly illustrates the label and envelope feeding means, and the zone in which the labels are applied to the envelopes.

FIG. 3 is an enlarged fragmentary vertical sectional view taken along line 3—3 of FIG. 2, and more clearly illustrates a removable feed table of the machine, portions of a drive mechanism for feeding individual ones of the envelopes by feed belts to the label applying zone, and a mechanism for preventing the double-feed of the envelopes.

FIG. 3-A is an enlarged fragmentary vertical sectional view taken along line 3A–3A of FIG. 2, and illustrates a device for moistening predetermined areas of each envelope, and a punch for severing individual labels from a strip of labels and applying an individual label to an associate envelope.

FIG. 4 is a fragmentary top plan view of the labelling machine of FIG. 1 with parts removed for clarity, and illustrates various drive connections for operating movable components of the machine.

FIGS. 5A and 5B illustrate a circuit diagram of the labelling machine.

FIG. 6 is a fragmentary top plan view of a strip of labels of the type used with the labelling machine of this invention, and illustrates a variety of individually coated labels which are sensed by detecting means forming a portion of the circuit of FIGS. 5A and 5B of the labeling machine to control the various operations thereof.

FIG. 7 illustrates a sensing circuit of the circuit diagram shown in FIGS. 5A and 5B.

The labelling machine is best illustrate' in FIGS. 1 through 4 of the drawings, and is generally referred to by the reference numeral 10. The machine is illustrated in a form particularly adapted for mailing purposes in which it applies an individual label L from a plurality of labels PL (FIG. 1) to individual articles A, such as envelopes, postcards or similar sheet-like members from a stack of articles SA. The term "article" is generic in the sense of this invention to such articles as post and postal cards, tags, label sheets, empty envelopes, filled envelopes, flexible matter, and other articles which may or may not have labels attached thereto.

The labelling or label-applying machine 10 comprises a base housing 11 having a base plate 12 of a generally rectangular configuration to which are secured four vertical posts 13–16 (FIG. 4). A side plate 17 (FIGS. 1 and 4) is secured to the post 14 by a hinge 18 while a similar side plate 20 (FIG. 4) is joined by a hinge 21 to the post 13. The side plates 17 and 20 permit access to the interior of the housing 11 for purposes of maintenance or inspection by swinging the side plate 20 in a clockwise direction about the axis of the hinge 21 as viewed in FIG. 4, while the side plate 17 is similarly opened by a counterclockwise swinging thereof as viewed in this same figure. Conventional and identical fastening means 22, 22 secure the side plates 17 and 21 in the closed positions thereof. A top plate 23 of the housing 11 is connected by conventional hinges 24, 25 (FIG. 2) to the respective posts 15 and 16 for permitting access of the housing 11 from above by swinging the top plate 23 in a counterclockwise direction as viewed in FIG. 3A of the drawings.

A feed table 26 (FIGS. 1 and 4) is removably and adjustably carried by the housing 11 of the machine 10. The feed table 26 includes a bottom plate 27, a pair of side plates 28, 30 (FIG. 4) and a top plate 31 (FIG. 2) interrupted by a pair of spaced parallel slots 32 and 33. Each of the side plates 28, 30 is provided with an identical upper slot 34 and a lower slot 35 (FIG. 3) receiving respective cylindrical shafts or bars 36, 37 secured in a conventional manner between the vertical posts 13 and 14 (FIG. 4).

The feed able 26 is substantially identical in structure and function to the mechanism shown in my copending application Ser. No. 250,393 and now Pat. No. 3,322,602 of May 30, 1967. As disclosed in this latter application the feed table 26 further includes half-nuts 38, 40 (FIG. 4) secured to the respective plates 28, 30 having threaded portions (unnumbered) engaging a threaded portion of a shaft 41 (FIGS. 2 and 3) journalled for rotation in journals 42, 43 (FIG. 4) fixed to the base plate 12 of the housing 11. Rotation of the shaft or spindle 41 when a hand weel 44 secured thereto is rotated produces a transverse movement of the feed table 26 in one direction or another in accordance with the direction in which the spindle is rotated.

The top plate 31 of the feed table 26 has secured thereto a pair of transversely spaced standards 45, 46 (FIG. 1) having upper portions apertured for receiving a rod 47 (FIG. 2) to which is attached guide or cheek plates 48 (FIG. 2). The guide plates 48 can be shifted transversely of the top plate 31 and fixed in position by binder screws 50 carried by the standards 45, 46 and engaging the rod 47.

A stop plate 51 (FIGS. 2 and 3) is fixed to the standards 45, 46 for maintaining the leading edges of the articles A at a predetermined position of inclination relative to the top plate 31 of the table 26.

The stack of articles SA rests upon two conveyor belts 52, 53 (FIGS. 1 and 2) having upper runs (unnumbered) passed through the respective slots 32, 33 in the plate 31. The two belts 52, 53 pass around pulleys 54, 55 fixed to respective shafts 56 (FIG. 3), 57 (FIG. 4). Conventional brackets 58, 59 (FIG. 4) receive the respective shafts 56, 57 and are secured to the underside of the top plate 31 (not shown) for supporting the pulleys 54, 55 and the belts 52, 53 in the position illustrated in FIG. 3 of the drawings. The upper runs of the belts 52, 53 are supported medially of the pulleys 54, 55 by pulleys 62 rotatably carried by a shaft 62a which is in turn secured to the underside of the plate 31 by a bracket 62b (FIG. 4) by means of screws or other conventional fastening devices (not shown).

The shaft 57 carrying the pulleys 55 is provided with a sprocket 60 (FIG. 4) for a driving chain-belt 61. A number of main feed rollers 63 are fixed on a feed shaft 64 conventionally journalled for rotation by anti-friction bearings in brackets (not shown) secured to the feed table 26. Adjacent to the side plate 28 of the feed table 26 the shaft 64 has a sprocket 66 about which is entrained the driving chain-belt 61. Adjacent the side plate 30 (FIG. 4) the shaft 64 has fixed thereto a clutch element 68 for cooperation with a clutch element 69 which is slidable on the shaft 64 and is fixed to a gear 70 (FIG. 3) in mesh with a pinion 71. A driving motor 72 (FIGS. 1 and 4) is mounted on a projecting portion (unnumbered) of the base plate 27, and includes a shaft (unnumbered) carrying a sprocket 73 (FIG. 4). A chain-belt 74 is entrained about the sprocket 73 and a sprocket 75 fixed to a smaller sprocket 76. A further chain-belt 77 is entrained about the smaller sprocket 76 and a sprocket 78 to which is secured the sprocket or pinion 71. The shafts (unnumbered) of the various sprockets and pinions are journalled to the feed table 26 in the manner fully disclosed in U.S. Pat. No. 3,322,602.

The clutch elements 68, 69 are normally biased to a disengaged position (FIG. 4) by a spring (not shown) but are urged into engagement by a plunger 82 (FIG. 4) of a solenoid 83 (FIGS. 5A–5B) mounted by a housing 84 to the side plate 30 of the feed table 26. Upon the energization of the solenoid 83 in a manner to be described hereafter, the planger 82 is advanced toward the side plate 28 (FIG. 4) urging the gear 70 and the clutch element 69 carried thereby toward the clutch element 68, thus engaging the clutch elements 68, 69 to impart motion to the main feed rollers 63 and the conveyor belts 52, 53 to advance a bottommost one of the articles A from right-to-left as viewed in FIGS. 1–3 and 4 of the drawings.

A plurality of separator devices 85 (FIG. 3), of which only one is illustrated, are supported on the plate 51. Each of the separator devices 85 includes a body 86 mounted for vertical sliding movement in a key or guideway 87 secured to the plate 51. Each body 86 includes a threaded stem 88 threaded in an aperture (unnumbered) in a member 89 secured to the plate 51 above an associated one of the guideways 87. A spring (unnumbered) normally urges each of the bodies 86 downwardly, as viewed in FIG. 3 of the drawings, and the tension of the spring is adjusted by a turning a knob (also unnumbered) carried by the stem 88. A selector piece 79 is carried by the lower end portion of each of the bodies 86 in overlying relationship with each of the main feed rolls 63.

The selector pieces 79 are preferably circular abrasive stones immovably carried by the bodies 86, and are adjusted at a distance from a respective feed roll 63 so that only a lower most one of the articles A is fed into the interior of the housing 11 of the labelling machine 10 and double-feeding of the articles A is thus prevented.

The feeding of the articles A is controlled by coded indicia I (FIGS. 1 and 6) in the form of conductive marks applied to selected ones of the labels L of the plurality of labels PL as the same are fed from a hopper 90 (FIG. 1) by feed means, generally referred to by the reference numeral 91 (FIG. 2) toward a detecting means 92 (FIG. 1). The feed means 91 corresponds to the label feeding apparatus disclosed in my copending U.S. application Ser. No. 343,408, and now Pat. No. 3,273,436 issued on Sept. 20, 1966.

The feed means 91 feeds the plurality of labels PL along a predetermined path in a direction substantially normal to the movement of the articles A. The main drive for the feed means 91 is a motor 93 (FIG. 4) secured to the base plate 12 of the housing 11. The motor 93 includes a shaft 94 carrying a drive sprocket or pulley 95. A drive belt or pulley belt 96 is entrained about the pulley 95 and a larger pulley 97 fixed to a shaft 98 which is in turn journalled between a pair of spaced upstanding arms 100, 101 of a bracket 102 fixed by conventional fasteners, (not shown) to the base plate 12. A gear 103 is affixed to the shaft 98 adjacent the arm 100. A gear (not shown) secured beneath the top plate 23 of the housing 11 is in mesh with the gear 103, and the former gear has fixed thereto a pulley (not shown) about which is entrained a drive belt 104 (FIG. 2). The drive belt 104 is entrained about a pulley or sprocket 105 fixed to a main shaft 106 rotatably journalled by bearings (not shown) in journal boxes 107, 108 secured to the upper surface of the top plate 23. The shaft 106 includes a flywheel 110 and terminates in a clutch element 111 having clutch teeth (unnumbered) opposing similar clutch teeth (also unnumbered) of a clutch element 112 carried by a transversely shiftable shaft 113 rotatably journalled in upstanding spaced journalling blocks 114, 115 secured to the top plate 23 of the housing 11. A wide gear 116 is secured to the shaft 113 and is in turn meshed with a gear (not shown) conventionally journalled in the housing 11, the latter gear being in mesh with another gear (also not shown) fixed to the end of a feed and timing cam shaft 117. The gear 116 and the other two gears (not shown) have the same number of teeth so that one full revolution or cycle of the shaft 113 is accompanied by a like full revolution of the shaft 117. The shafts 113 and 117 are intermittent shafts because their times of rotation are controlled by the clutch elements 111 and 112.

The shaft 113 is normally urged upwardly, as viewed in FIG. 2 of the drawings, by a spring 118 surrounding a portion of the shaft 113 between the wide gear 116 and the journal 115.

A label pressure plate 120 overlies the predetermined path of travel of the labels L along the top plate 23. A gate frame 121 is pivoted at one end to the shaft 117 and secured at an opposite end to the label pressure plate 120. A rocker 122 is pivoted at an intermediate point of its length on an upright stud (unnumbered) carried by the gate frame 121 beneath a cover 123 thereof. One end of the rocker 122 has a cam follower roller (not shown) which is engaged in a cam groove (unnumbered) formed in a sleeve 124 that concentrically surrounds the shaft 117 and is keyed to rotate therewith. The opposite end of the rocker 122 has a roller (not shown) engaged in a slot (unnumbered) in a bridge piece 125 secured to a pair of shuttle bars 126, 127 in the manner more fully disclosed in the latter of the noted applications.

The shuttle bars 126, 127 are in alignment with respective grooves 128, 129 in the top plate 23 of the housing 11, and each of the shuttle bars 126, 127 includes a plurality of feed lugs (not shown) which project downwardly toward the grooves 128, 129 for engagement with preferations P (FIG. 6) in the labels L for advancing the latter in a manner to be described hereinafter.

Fixed on the shaft 113 (FIG. 2) is a disk 130 having at an upper face thereof, as viewed in this same figure, a hump (unnumbered) with a slow rise and a quick drop, and at the lower face a stop block 131. A roller 133 is journalled beneath one end of a lever 134 which is mounted intermediate its length on a pivot pin (unnumbered) between the upstanding journals 114, 115. The lever is pivotally connected at its other end to a core 135 (FIG. 3A) of a solenoid 136. The lever 134 includes a rockable detent 137 which swings in a plane parallel to the axis of the shaft 113 and includes a downward projection or detent (not shown) for engagement by the stop block 131 of the disk 130 for determining the end of a cycle of movement of the shaft 113. A spring 138 acts to biasingly rock the lever 134 to a position with the roller 133 in the path of the hump (unnumbered) at the upper side of the disk 130 as viewed in FIG. 2, and with the detent 137 presenting its projection for engagement by a ramp portion (not shown) on the opposite side of the disk 130.

In the mechanical operation of the feed means 91, the shaft 106 with the clutch element 111 is driven constantly through the driving connection heretofore described from the motor 93 (FIG. 4). At the start of the feed cycle, the roller 133 (FIG. 2) engages the hump (unnumbered) to the upper side of the disk 130 as viewed in FIG. 2 and holds the disk 130 and the shaft 113 at a bottommost position with the clutch elements 112 and 111 disengaged. The shaft 113 is thus motionless at an initial position which is determined by the detent projection 137 between the stop block 131 and the ramp (not shown). A severing means or knife 140 (FIG 3A) to be described fully hereafter is in a raised position at the beginning of a feed cycle, and a leading label of the plurality of labels PL is positioned adjacent this severing means 140 beneath the detecting means 92 (FIG. 1).

When the solenoid 136 is energized, in a manner to be more fully described hereafter in connection with FIGS. 5A and 5B, the lever 134 is rocked clockwise as viewed in FIG. 3A and the roller 133 is lifted from contact with the hump (unnumbered) of the disk 130. The spring 118 forces the shaft 113 upwardly in FIG. 2 to engage the clutch elements 111, 112 thus imparting clockwise rotation of the shaft 113 as viewed in FIG. 3A of the drawings. The gear 116 on the shaft 113 drives the shaft 117 clockwise through the two meshed gears heretofore described (not shown) causing rotation of the sleeve 124. Rotation of the sleeve 124 causes its cam groove (unnumbered) to move the rocker 122 and the bridge 125 so that the shuttle bars 126, 127 and their lugs feed the labels in a direction toward the severing means 140. The continued rotation of the shaft 117 causes the sleeve 124 to return the rocker 122 to its original position. The circuit or electrical system of FIGS. 5A and 5B normally effects deenergization of the solenoid 136 shortly after its energization, as will be described fully hereafter, and the lever 134 is returned toward its initial position. As this occurs under the influence of the shaft 113 approaching its initial position, the hump (unnumbered) of the disk 130 engages the roller 133 with the disk being forced by the roller downwardly in FIG. 2 until the clutch elements 111, 112 are disengaged. The stop block 131 on the disk 130 encounters the detent projection 137, and the latter is again dropped into the space between the stop block 131 and the ramp (not shown) whereupon the shafts 113 and 117 are brought to a standstill at the initial position. This operation is repeated to continually reciprocate the shuttle bars 125, 126 of the feed means 91 to feed the plurality of labels PL toward and beyond the detecting means 92 for subsequent application to the articles A.

The detecting means 92 (FIG. 1) includes a housing 145 secured to the pressure plate 120 between the cover 123 and the severing means 140. Within the housing 145 are located three sets or pairs of electrodes 146, 147 and 148 (FIG. 7) which project downwardly and contact a respective conductive pad 150 and non-conductive pads 151, 152 suitably mounted in the top plate 23 of the housing 11. The electrodes or conductors 146–148 and the pads 150–152 of the detecting means 92 sense or detect various codes in the form of conductive marks on the labels L to vary the functions of the machine 10 in a manner to be more fully described hereafter in connection with the circuit system of FIGS. 5A and 5B, and the label strip of FIG. 6.

Upon passing beyond the detecting means 92, the individual labels L of the plurality of labels PL (FIG. 1) are severed by the severing means 140 and applied to an associated article A, or in the absence of such an article, are discarded in a discharge label-receiving hopper 149 (FIG. 4). The severing means or punch 140 is cyclically operated under the influence of the shaft 113 as will appear fully hereafter. The severing means 140 includes a rock arm 155 (FIG. 3A) having a slot 156, illustratively radially positioned relative to the axis of a shaft 157 which is mounted by brackets (not shown) carried by the top plate 23 to either side of the rocking arm 155. A roller 158 is also carried by the shaft 157 and projects through an opening (not shown) in the top plate 23 of the housing 11 for cooperation with feeding means 160 in a manner to be described more fully hereafter. The slot 156 receives a roller 162 carried by a disk 163 which is in turn secured to the shaft 113 (FIG. 2). The roller 162 is effective as a crank pin for coacting with the walls of the slot 156 to produce a reciprocation of the rock arm 155 upon the rotation of the shaft 113 in the manner described.

A lower edge portion 164 of the rock arm 155 forms a knife for severing the labels L upon the counterclockwise pivoting of the rock arm 155 from the position illustrated in FIG. 3A to a position in an opening 165 of the top plate 23 corresponding in shape and size to that of the knife 164. The upward or clockwise return movement of the rock arm 155 is assisted by springs 166 (FIG. 2) secured at one end to either side of the rock arm 155 and at the opposite ends thereof to a bracket 167 fixed to the top plate 23 of the housing 11. A roller 168 (FIG. 3A) is journalled in the rock arm 155 and projects below the knife portion 164 for pressing a severed "proper" label against a passing article A carried by the conveying means 160, and for pressing a severed "improper" label against a spring biased counter roller 170 (FIG. 3A) of the feed means 160 for discharge into the hopper 149 (FIG. 4).

The plurality of labels PL have remoistening gum or adhesive thereon, and each of the articles A to which a label is to be applied must be moistened at a predetermined area prior to receiving a "proper" label. To this end, the labelling machine 10 includes wetting means or a moistening apparatus 169 (FIG. 3A) which is substantially identical to the moistening apparatus disclosed in my copending U.S. application Ser. No. 169,439, filed Jan. 29, 1962 and now Pat. No. 3,274,043 issued Sept. 20, 1966.

The moistening mechanism 169 includes a moistening member 171 (FIG. 3A) supported by brackets (not shown) in the opening in plate 23. The moistening member 171 includes a plurality of jets 172 (only one being illustrated) in fluid communication with a reservoir 173 (FIG. 1) by means of a conduit 174. A valve (not shown) in the reservoir 173 is actuated to meter moistening fluid, such as water, upon the actuation of a solenoid 184 forming a part of the circuit system of FIGS. 5A and 5B for moistening a predetermined area of each of the articles A in a manner to be described more fully hereafter.

The conveying means 160 is substantially identical to the belt feeding mechanism for articles disclosed in my copending application Ser. No. 350,707, filed Mar. 10, 1964 and now abandoned.

The feeding means 160 includes a bracket assembly 180 (FIG. 3A) secured to the base plate 12 of the housing 11. A first rocker member 181 is mounted on a stud 182 and is fixed to a downwardly extending arm 183 which is drawn clockwise in FIG. 3A by a tension spring 189 connected at its other end to a bracket arm 185 of the bracket assembly 180. The rocker member 181 supports a pivot 186 for a pair of plates 187 (only one being illustrated). One of the plates 187 has a downward crank arm 188 for engaging a spring 190 connected to the arm 183 and serving to draw the two arms together. A pulley 191 is supported by a shaft 192 journalled between each of the pair of plates 187. The pair of plates 187 also support a belt tension pulley 193.

A stud 194 is associated with a similar but symmetrical system including a second rocker member 195 its arms 196 and its springs 197 extending to bracket arms 198, a pivot 200, a shaft 201 and its pulley 202 and a tension pulley 203. The plates are affixed to their respective pivots and to downwardly extending arms 206 connected by springs 207 to the respective arms 196 whereby a downward movement at one end of the conveying or feeding means provides an upward movement at an opposite end thereof. This maintains the pulleys in press contact with a belt 210 and therewith holds the belt 210 against the passing articles A by equalizing the upward effects of the end and intermediate pulleys.

The stud 194 also supports a crank lever 211 which is normally urged in a clockwise direction as viewed in FIG. 3A by a torsion spring surrounding the stud 94 in a conventional manner (not illustrated). The crank lever 211 has fixed at its other end the discharge label roll 170 whose periphery is slightly beneath the upper run of the belt 210 and offset to one side thereof (FIG. 4). An arm 215 (FIG. 3A) carries a roller 216 (FIG. 4) cooperative with the periphery of the label discharge roller 170 to discharge discarded "improper" labels therebetween into the hopper 149 as appears more fully in the latter-noted of my patents.

The drive mechanism for the feed means 160 is derived from the motor 93 (FIG. 4) by means of a sprocket 220 secured to the shaft 98. A belt 221 is entrained about the sprocket 220 and a sprocket 222 fixed to a shaft 223 projecting outwardly an either end of a housing 224 secured to the base plate 12 of the housing 11. A universal coupling 225 is connected at one end to the shaft 223 and at an opposite end to the shaft 192 to which the pulley 191 is fixed.

Counterclockwise rotation imparted to the pulley 191 moves the upper run of the conveyor belt 210 from right-to-left as viewed in FIG. 3A to discharge a properly labelled article outwardly of the housing 11 and into a hopper 230 (FIGS. 1, 3A and 4).

The proper labelled articles are assisted in their discharge into the hopper 230 by means of a roll 231 journalled for rotation in a conventional manner and supported by journalling brackets 232, 233 connected to the respective posts 15, 16 (FIG. 4). A pulley (not shown) is fixed to an upper end of the roller 231, as viewed in FIG. 4, and a pulley belt 235 is entrained about this latter pulley and a pulley 236 fixed to the shaft 223. Upon rotation of the shaft 223, the belt 235 rotates the roll 231 to discharge the properly labelled articles into the hopper 230.

A roller 240 (FIGS. 1 and 3A) is journalled by a stud 241 in a housing 242 pivotally mounted on a cross bar 243 between the posts 15 and 16. The roll 240 urges the labels applied to the articles into intimate contact with the latter upon passing between the bight of the roll 240 and the roll 231.

In addition to the various components thus far described, the labelling machine 10 includes a plurality of detecting means or similar devices, generally in the form of switches and switch arms contactable by the articles A during the feeding thereof through the machine 10. One such switch 250 (FIG. 3A) includes a switching arm 251 actuated by the leading edge of an article A while a similar switch arm 252 (FIG. 4) of a switch 253 is also actuated by the leading edge of an article. The switch arm 252 of the switch 253 is adjusted lengthwise of the direction of travel of the articles A upon the belt 210 by a mechanism 255 in a manner and for a purpose clearly and fully disclosed in application Ser. No. 250,707, and a further description thereof is considered unnecessary for an understanding of this invention.

Referring to FIG. 6 of the drawings, a selected label sheet SL of the type used with the labelling machine 10 is shown coded with "proper" labels, "improper" and "zone" coded labels. The label sheet or strip SL includes a succession of label areas along its length there being "proper" unmarked labels L–1, L–2, L–4, L–5, L–9, L–11, L–12; "improper" labels L–3, L–10, each having a conductive central spot 290 thereon; and "zone" labels such as L–7, marked with a central conductive spot 290 and one or two lateral conductive spots 291, and preceded by a label area L–6 having a central conductive spot 290. When the strip is to be fed only in the direction of the headed arrow in FIG. 6 the area L–8 may be either "proper" or "improper." If the strip is prepared to be fed in either direction, "improper" label markings are provided at each side of the "zone" label area, as at L–6 and L–8. The term "proper" is employed throughout to mean a label area which is to be applied to an article while an "improper" label is one which is discarded into the hopper 150 in the absence of a fed article A. A "zone" label, when detected, stops both the label and article feed to indicated that a predetermined number of properly labelled articles to be delivered to a particular area or postal zone has been delivered to the hopper 230, and these labelled articles are to be removed prior to initiation of a subsequent labelling operation.

In operation, the presence of a "proper" label, without conductive material thereon, will effect an operation as will be set out more fully hereinafter, by which an article A will be advanced, its position in the machine sensed, a cyclic operation in the machine started to advance the label area from the position of L–2 to that of L–1, the label severed and delivered to the article and the labelled article discharged, concurrently with the advancement of the next label area to the position L–2 to be scanned or sensed. In FIG. 6, the leading area L–1 is shown in this position having past a severance line 294 along which the strip is severed by the severing means 140 (FIG. 3A) for delivery of the area L–1 to an article.

When there is a central conductive spot 290 on a label area, this is detected at the position L–2 of FIG. 6 by the detecting means 92 and a cycle is started without article advancement but with the label area advanced to the position L–1, severed and discarded.

When a central "improper" mark 290 is followed by a "zone" marking 291, the central mark 290 causes a cycle of label advancement without article feeding, and therewith the "zone" marked label is brought to the position of the label area L–2 without article feeding. The machine stops and the label articles can be bundled and removed as a group from the hopper 230.

The operation of the labelling machine 10 will now be described in conjunction with the circuit system of FIGS. 5A and 5B, it being assumed that the labelling machine 10 was shut-down after a prior normal run, that no power is applied to the circuit system with the various solenoids, relays, pilot lights, etc. to be described being deenergized and the solenoid relay contacts being in the position illustrated in FIGS. 5A and 5B.

It is further assumed that a stack of articles SA are positioned between the guide plates 48 atop the feed belts 32, 33 and that a sheet of labels PL has been placed on the top plate 23 of the housing 11 beneath the label plate 20 ready for feeding but not yet advanced for engaging the conductors 146–148 of the detecting means 92.

If the labelling machine 10 has been shut-down for a period of time during which the moistening means 169 has become dry, the reservoir 173 (FIG. 1) is first filled and a main switch 301 (FIG. 5A) is closed causing current flow from a service connection wire 300 to a supply conductor 302 in the machine 10. This current flows to the main motor 93 and back from a general return conductor 303 to the other service connection wire 304. A pilot lamp 305 mounted on the side plates 17 (FIG. 1) of the housing 11 is lit when the switch 301 is closed by current flow over the path 302, the lamp 305 and the conductor 303 thus indicating that the power is on. Current also flows to the primary of transformers 306, 319 and from the secondaries thereof.

If the labelling machine 10 has been shut-down for a period during which the moistening means or system 180 has become dry, a manual priming switch 307 accessible at the side plate 17 of the housing 11 is closed. Current flows from the secondary of the transformer 306 by the path:

(1) The secondary of the transformer 306, a conductor 315, a conductor 316, the solenoid 184 of the moistening system 169, a conductor 317, the now closed switch 307, a conductor 318 and a conductor 320. The switch 307 is held closed until a proper amount of the moistening liquid is at the nozzles 172 (FIG. 3A), and the switch 307 is then reopened.

With a manual article feed switch 321 in its righthand position, current flows over a path formed by the conductor 302, a conductor 322, a conductor 323, a pilot lamp 324, a conductor 325, contact 326 of the article feed switch 321, a conductor 327, and the conductor 303. The pilot lamp 324 is exposed through the side plate 17 of the housing 11 (FIG. 1) and when lit indicates that the machine is ready for article feeding.

The current flow through the primary of the transformer 319 causes current flow in its secondary to energize a pair of sensor units 330, 331 (FIG. 7) which scan and respond to code markings on the labels and therewith determine the rejection of an "improper" label or signal the arrival of a "zone" coated label. The sensor units are conventionalized in the circuit system of FIGS. 5A and 5B, and the connections are shown in the sensor system diagram of FIG. 7.

The sensor units 330, 331 are illustratively shown as outlines having identical contents. For each, a conductor 400 from the transformer secondary of the transformer 319 leads to a rectifier 401 shown as a semiconductor diode, with a circuit continuing thence by a conductor 402 to a controlled rectifier 403 and by a conductor 404 to the coil 405 of a relay 409 illustratively having a bridge which, when the coil is energized, closes contacts for respectively connecting conductors 335, 336 and conductors 337, 338 in the sensor units 331, 330. A branch of each of the conductors 402 leads to a rectifier 406 and by a conductor 407 to another terminal of the respective coils 405. The other terminal of the transformer 319 is joined by a conductor 410 to two capacitors 411, 412 which are respectively connected to the conductors 402, 407. Because of the reverse connections of the rectifiers 401, 406 and the capacitors 411, 412, these parts perform as a voltage doubler, so that a transformer secondary of six volts potential can be employed to activate the twelve volt relay coils 405.

The label detecting contactors 146 are connected by conductors 412, 413 to the sensor unit 331, and the contactors 147, 148 are connected by conductors 414, 415 to the sensor unit 330. Within the respective sensor units 330, 331 the conductors 412 and 414 are connected to the respective conductor 402 and the conductors 413, 415 are connected to a respective resistor 416 and a capacitor 417 connected in parallel with the circuit continuing by a conductor 418 to the control electrode of the rectifier 403. The RC circuit of resistor 416 and capacitor 417 is employed to prevent a burn-out if the contactors 146, 148 are shorted together for a long period. The controlled rectifiers 403 may be silicon devices capable of passing five amperes when gated by a pulse of a couple milliamperes which is developed between conductors 402, 407 when a conductive coating 190, 191 is presented by a label area at the respective contactors 146 and 147, 148.

Since no label of the plurality of labels PL is at the contactors 146, the conductive pad 150 connects the conductors 412, 413 and the relay 405 of the unit 331 is energized to electrically connect the conductors 335 and 336. Current flows by the path:

(2) The conductor 302, the conductor 335, the now closed contact of the relay 405, the conductor 336, a coil of a label sensing relay 340, a conductor 349 and the conductor 303. The label sensing relay 340 is energized and lifts its bridges or contacts. This forms a path for energizing a clutch cycle as follows:

(3) The conductor 302, the conductor 341, a conductor 342, the clutch solenoid 136, a conductor 343, a bridge 344 of a deenegrized clutch holding relay 345 a conductor 346, a now closed bridge 347 of the energized label sensing relay 340, a conductor 348, the article sensing switch 251, (closed in the absence of an article), a conductor 350, a conductor 351, a bridge 352 of a closed manually operable label switch 353, a conductor 354 and the conductor 303. This energizes the clutch solenoid 136 and cycles the intermittent shaft 113 and the label feeding means 91 is operative to feed labels in the manner heretofore described.

The label sheet, as for example, the selected label sheet SL, is advanced stepwise until the label area L–1 is brought beneath the contactors 146. The label area L–1 being a "proper" label i.e. unmarked or uncoded, the flow of current by the conductors 412, 413 is interrupted the relay 405 of the sensing unit 331 drops, and the path (2) is deenergized causing the label sensing relay 340 to drop. There is no flow by the conductors 414, 415 because the uncoded label area L–2 is now beneath the contactors 147, 148 and the unit 330 has its relay 405 open. Since a "proper" label has been detected by a detecting means 92, an article is released to receive this label as follows:

(4) A previous momentary closing of a manual hopper resetting switch 360 forms a path:

(5) The conductor 302, the conductor 322, a conductor 361, the switch 360, a conductor 362, a conductor 363, a coil of a hopper reset relay 365, a conductor 366, a resistor 367, a conductor 368 and the conductor 303. The relay 365 is energized and lifts its contacts or bridges. A closed contact 369 establishes a circuit for lighting a pilot lamp 370 over a circuit traced from the secondary of the transformer 306, the conductor 315, the pilot lamp 370, the now closed contact 369, and the conductor 320. The lamp 370 lights to indicate that the labelling machine 10 is ready to advance an article.

The energized solenoid 365 also closes a contact 372 to form a holding circuit for the relay 365 after the switch 360 is opened by the path:

(6) The conductor 302, a conductor 373, the now closed contact or bridge 372, the conductor 363, the coil of the relay 365, the conductor 366, the resistor 367, the conductor 368 and the conductor 303.

When the preceding cycle of the shaft 113 ended a path controlled by the deenergized label sensing relay 340 was formed:

(7) The conductor 302, the conductor 322, the conductor 373, a coil of a hopper holding relay 375, the conductor 374, a cam switch 379 closed at the end of the preceding cycle by a cam 376 carried by the shaft 117, a conductor 377, a conductor 378, a bridge 380 of deenergized relay 340, a conductor 381, a bridge 382 of the manual label switch 353, a conductor 383, closed bridge 384 of the manual of article switch 321, the conductor 327 and the conductor 303. This energizes the relay 375 lifting a bridge 390 to close a holding circuit of the relay 375 which bypasses the switch arm 379 by the path:

(8) The conductor 302, the conductor 322, the conductor 373, the coil of the relay 375, the conductor 374, a conductor 391, the now closed bridge 390, the conductor 378, the closed bridge 380 of the relay 375, and back to the conductor 303 as in path (7) above.

An article is now fed by the action of the motor 72 upon the energization of the solenoid 83 by the path:

(9) The conductor 302, the conductor 395, a connector 396, a conductor 397, a closed manual switch 398, the motor 72 and the solenoid 83 in parallel, a conductor 430, a conductor 431, a closed bridge 432 of the relay 365, a conductor 433, a closed bridge 434 of a deenergized relay 435, a conductor 436, the conductor 374, the conductor 391, the closed bridge 390 of the relay 375, a conductor 378, the closed bridge 380 of the relay 340, and back to the conductor 303 as in path (7). With the energization of the solenoid 83 the clutch elements 68, 69 (FIG. 4) engage and articles A from the stack SA are fed in the manner heretofore described.

(10) As an article advances, it encounters the article sensing switch 251 (FIG. 3A) and trips its contacts so that conductor 350 is connected to a conductor 437 forming a path:

(11) The conductor 302, the conductor 341, a coil of a relay 440, a time delay unit 441, a conductor 442, a bridge 443 of the deenergized relay 435, the conductor 437, the article sensing switch 251, the conductor 350, the conductor 351, the bridge 352 of the manual switch 353, the conductor 354 and the conductor 303. The relay 440 is energized after the time interval selected by the time delay unit 441, and then lifts its bridge 450 to form a path:

(12) The conductor 302, the conductor 341, the conductor 342, the coil 136, the conductor 343, the bridge 344 of deenergized relay 445, the conductor 346, a conductor 451, a bridge 452 of deenergized relay 340, a conductor 453, a conductor 454, bridge 450 of the energized relay 440, the conductor 442, bridge 443 of deenergized relay 435, the conductor 437, the switch 251, the conductor 350, the conductor 351, the closed bridge 352 of the manual switch 353, the conductor 354 and the conductor 303. The energization of the clutch solenoid 136 releases the clutch detents heretofore described and a cycle begins.

(13) As the intermittent shaft 117 turns from its initial position, the hopper timing cam switch 379 opens shortly after the start of the cycle, noting path (7) above, and the hopper holding relay 375 is held energized by the holding circuit established over path (8). After about 180° of rotation of the shaft 117, a clutch timing cam 470 carried thereby closes a clutch timing switch 471 and a path is formed as follows:

(14) The conductor 302, the conductor 341, a conductor 472, the coil of the clutch holding relay 345, a conductor 473, the now closed switch 471, a conductor 474, a conductor 475, the bridge 347 of the deenergized relay 340, the conductor 451, the bridge 452, the conductor 453, the conductor 454, the bridge 450 of the relay 440, the conductor 442, the bridge 443 of deenergized relay 435, the conductor 437, the article sensing switch 251, the conductor 350, the conductor 351, the closed bridge 352 of the manual switch 353, the conductor 354 and the conductor 303. This energizes the relay 345 and path (12) is opened so that the clutch solenoid 136 is deenergized and releases its detent to bring the shaft 117 to a standstill at the end of the prevailing cycle.

Also, a branch path is formed as follows:

(15) The conductor 302, the conductor 341, the conductor 472, the coil of the relay 345, the conductor 473, the conductor 477, a bridge 478 of energized relay 345, a conductor 480, the conductor 475, the bridge 347 of the deenergized relay 340, the conductor 346, the conductor 451, the bridge 452 of the deenergized relay 340, the conductor 453, the conductor 454, the bridge 450 of the energized relay 440, the conductor 442, the bridge 443 of the deenergized relay 435, the conductor 437, the switch 251, the conductor 350, the conductor 351, the closed bridge 352 of the manual switch 353, the conductor 354 and the conductor 303. This maintains the relay 345 energized so long as the relay 340 is deenergized, that is, so long as "proper" labels are appearing at the sensing contactors 146.

It should be noted that the path (14) through the coil of the relay 345 is controlled by the article sensing switch 251 i.e., the relay 345 remains energized as long as the article is engaged with the switch 251. Therewith, the path through the clutch solenoid 136 is opened at the bridge 344 of the relay 345 and no new cycle can be started. This prevents a second label being applied to a long article which is still acting on switch 251 when the cycle of the shaft 117 has been completed.

The energization of the relay 345 also closes the following path:

(15A) The conductor 302, the conductor 341, a conductor 481, the coil of the relay 435, a conductor 482, a bridge 483 of the energized relay 345, a conductor 484, the conductor 351, the closed bridge 352 of the manual switch 353, the conductor 354 and the conductor 303. This energizes the relay 435 and opens path (9) between the conductor 433 and 436 to prevent article feeding so long as relay 435 is energized. Energization of relay 435 continues as long as the relay 345 is energized by paths (14) or (15); that is, as long as the article sensing switch 251 is held by a passing article, and therewith a long article acts to prevent the feeding of a second article until the trailing ends of the passing article has left the switch 251.

During a cycle of the shaft 117 the label L-1 is advanced, severed by the means 140 in the manner heretofore described, and delivered to the passing article at the area thereof which has been wetted from the nozzles 172, the wetting being effected by the closing of the following circuit:

(16) The conductor 302, the conductor 341, a conductor 485, a coil of a wetting relay 486, the conductor 453, the conductor 454, the bridge 450 of the energized relay 440, the conductor 442, the bridge 443 of the energized relay 435, the conductor 437, the article sensing switch 251, the conductor 350, the conductor 351, the closed bridge 352 of the manual switch 353, the conductor 354 and the conductor 303. This wetting relay 486 acts to draw its armature (not shown) upwardly closing its bridge 490 and thus connects a conductor 491 and a conductor 492.

A wetting cam 493 carried by the shaft 117 closes a wetting cam switch 494 establishing the following path:

(17) The secondary of the transformer 306, the conductor 315, the conductor 316, the solenoid 184 of the reservoir, the conductor 495, the now closed wetting switch 494, the conductor 492, the closed bridge 490, the conductor 491, and the conductor 320, back to the secondary of the transformer 306. The solenoid 184 acts to open the valve (not shown) and flow begins at a time controlled by the high side of the cam 493, noting that the cam 493 is of a two-part construction which is adjustable on the shaft 117 to vary both the beginning of the wetting cycle and the length thereof to control the predetermined area which is wetted by the nozzles 172.

The wetting relay 486 is also interconnected with the article sensing switch 251 so that no wetting occurs in the absence of an article by the opening of path (16) when the switch 251 opens breaking the circuit established to the conductors 437 and 350.

When an "improper" label such as the label L-3 is fed to the detecting means 92 the contactors 146 cause current to flow in the conductors 412, 413 of the sensor unit 331 because of the conductive mark 190. This current flow energizes the relay 405 of the unit 330 connecting the conductors 335, 336 and establishing the following path:

(18) The conductor 302, the conductor 335, the unit 331, the conductor 336, the coil of the relay 340, the conductor 341 and the conductor 303. The relay 340 is energized lifting its bridges and establishing path (3) to advance the "improper" label L-3 to the severing means 140. Since the label L-3 is "improper," no article is to be released or fed and the label is dicarded. This occurs when the energized relay 340 breaks path (9) by the bridge 380 breaking contact between the conductors 378 and 381. With the cessation of current in the path (9) the hopper motor 72 and the clutch solenoid 83 are de-energized and no article advancement is effected. The label L-3 is severed by the blade portion 164 of the severing means 140 (FIG. 3A) and is discarded through the opening 165 in the top plate 23 of the housing 11 into the hopper 150.

When a "zone" coats the label such as L-6, appears at the contactors 146, the centrol conductor marking 190 for the 'improper" label causes the sensor unit 331 to close its relay and energize the label relay 340 over the path (2). No current flows between the conductors 378 and 381 because of the lifting of the bridge 380, and the connection to the conductor 303 from the conductor 252 is opened at the bridge 382. The relay 375 is deenergized and drops. Current by path (9) ceases and the hopper motor 72 and the clutch solenoid 83 are deenergized. A cycle is initiated by path (2) by which the label strip is advanced one step until the lateral spot or spots 191 act to connect one or both sets of the contactors 147, 148, at which time current flows in the conductors 414, 415 and the sensor unit 330 closes its relay to stop both article and label feed as follows:

Assuming that the hopper relay 365 is energized and maintained by paths (5) and (6) above, which includes the resistor 367, the closure of relay 405 in the sensor unit 330 provides a low resistance path as a bypass for the coil of relay 365 and the resistor 367 in series therewith, by the path:

(19) The conductor 337, the conductor 363, the coil of the relay 365, the conductor 366, the conductor 338, and the closed contacts of the sensor unit relay. The drop of current through the relay 365 causes it to drop its bridges, and no current can flow through its bridge 369 and the circuit established by path (9) through the hopper motor 72 is open at an additional point an no further articles are fed. With the simultaneous opening of the bridge 369 the flow of current to the pilot lamp 370 over the path (5) ceases and the lamp 370 extinguishes. The bridge 372 is also opened and the holding circuit for the relay 365 is similarly opened.

During the advancement of the label sheet, the central mark on the label L-6 moves beyond the contactors 146 and the "zone" label L-7 underlies these contactors. The sensor unit 331 again causes energization of the label relay 340 by path (2), but the path from conductor 378 by its bridge 380 leads to the open side of the bridge 382 of the switch 353. Since this path is opened, no article will come to the article sensing switch 251, the clutch solenoid 136 will not be energized and the feeding of the label sheets stops.

The machine is now essentially at a standstill. An attendant can remove the labelled articles and tie them to a bundle. The machine can then be restarted by pressing the resetting switch 360 to establish path (5), the relay 365 closing and establishing its holding circuit, and the hopper motor 72 and the solenoid 83 being reenergized so that an article is fed. The article actuates the switch 251, a cycle is started after the time determined by the time delay device 441, and the label L-8 is applied thereto.

Feeding continues in the manner heretofore described with the label L-9 being applied to a subsequent article, the "improper" label L-10 being discarded, and the labels L-11, L-12, etc., being subsequently sensed and applied to the articles or discarded in response to the absence or presence of coding thereon.

The labeling machine 10 is also provided with a counting device, generally referred to by the reference numeral 500, for determining the number of articles labelled during the operation of the machine. The counting device 500 is a conventional ratchet-type counter including a plurality of ratchet wheels, a unit ratchet wheel 501 of which is actuated by a pivotally mounted pawl 502 under the action of a coil 503 energized over the following path:

(20) The conductor 302, the conductor 341, the conductor 504, the coil 503, a conductor 505, the bridge 483 of the deenergized relay 345, the conductor 484, the conductor 475, the bridge 347 of the deenergized relay 340, the conductor 451, the bridge 452, the conductor 453, the conductor 454, the closed bridge 450 of the relay 440, the conductor 442, the bridge 443 of the deenergized relay 435, the conductor 437, the article sensing switch 251, the conductor 350, the conductor 351, the closed contact 352 of the switch 353, the conductor 354 and the conductor 303. By this circuit the coil 503 of the counting mechanism 500 is energized and moves its armature against the action of a spring 510 each time the switch 251 is closed. Deenergization of the relay 345 by the path (14) breaks this path between the conductors 505 and 484 at the bridge 483 causing deenergization of the coil 503. The armature of the coil is then drawn downwardly by the spring 510 and advances the counting device one unit.

In addition to functioning automatically in the manner heretofore described, the labelling machine 10 can, when desired to test article feeding parts and circuitry or labelling feeding parts and circuitry, feed only articles or only labels. For example, when it is desired to feed articles only the label switch 353 is moved to the left from the position illustrated to denote that no labels are to be fed. It will be assumed that prior to movement of the switch 353 there is no label sheet in the machine so that the contactors 147 are acting through the sensor unit 331 to energize the label relay 340 as in path (2) above. It is also assumed that the manual article switch 321 is in or moved to a right-hand or "On" position to denote that articles are to be fed and that the shaft 117 is at or comes to its initial position and is latched thereat so that the flow by path (7) has energized the relay 375 and its holding circuit by path (8). The clutch holding relay 354, the label placement delay relay 340, the hopper pulsation relay 435, and the wetting relay 486 are all in deenergized condition. When the switch 353 is moved, the relay 365 is energized and so remains or alternatively, it can be assumed that the manual reset switch 360 is momentarily closed to energize and maintain the relay 365 by the paths (5) and (6) above. It is also assumed that articles are present at the hopper.

Movement of the switch 353 to the left causes its bridge 352 to open the paths through the conductors 351, 354, and its bridge 382 to open the paths between the conductors 383 and 381 while closing a path:

(21) The conductor 302, the conductor 395, the conductors 396, the conductor 397, the closed switch 398, the hopper motor 72 and the hopper clutch solenoid 83 in parallel, the conductor 430, the conductor 431, the bridge 432 of the energized relay 365, the conductor 433, the bridge 434 of the deenergized relay 435, the conductor 374, the cam switch 375 which is closed at the end of the last cycle of the intermittent shaft 117, the conductors 378, the bridge 380 of the energized relay 340, the bridge 382 of the switch 353, the conductor 383, the bridge 384 of the switch 321, the conductor 327 and the conductor 303. The hopper motor 72 runs and the hopper clutch is held closed by the solenoid 83 so that articles are fed one-by-one. The relay 375 is held energized by the following path:

(22) The conductor 302, the conductor 322, the condutor 373, the coil of relay 375, the conductor 374, the conductor 391, the closed bridge 390 of the relay 375, the conductor 378, the bridge 380 of the deenergized relay 340, the conductor 381, a bridge 382 of the relay 353, the conductor 383, the bridge 224 of the switch 321, the conductor 327 and the conductor 303.

As the articles come to the sensing switch 251, no result occurs because the conductor 350 therefrom is open at bridge 352 of the switch 353 opening the circuit between the conductors 351 and 354. The articles are not wetted because the wetting relay 486 is deenergized by its supply conductor 453 being opened at the bridge 452 of the relay 340 and at the bridge 450 of the deenergized relay 440. The clutch timing cam switch 471 and the wetting cam switch 494 cannot close because the shaft 117 is at a standstill in initial position. The clutch solenoid 136 cannot be energized even though the bridge 344 of the relay 345 connects the conductors 343 and 346 because the conductor 346 is disconnected from the conductors 475 and 453 at the bridges 347 and 452 of energized relay 340 and the connection of conductor 343 at the bridge 344 to the conductor 348 leads to the sensor switch 251 which is open at the bridge 352 between the conductors 351 and 354 of the switch 353. The relay 440 is deenergized because its supply conductor 442 to the bridge 443 of the relay 435 and by the conductor 437 to the switch 251 and by the conductor 350 is open at the switch 251 by the open bridge 352 of the switch 353. Thus, the article feeding is not accompanied by any energization of the clutch solenoid 136 or other label feeding parts.

When it is desired to operate the label feeding components of the labelling machine, without article feeding, the manual label switch 353 is left in or moved to the right-hand or "On" position shown in the circuit diagram, and the manual article switch 321 is moved to the left-hand or "Off" position. The lamp 324 is extenguished as the bridge 326 is opened. The bridge 382 of the switch 353 does not pass current because the conductor 383 is opened at the bridge 384 of the switch 321. The clutch solenoid 136 is energized by the following paths:

(23) The conductor 302, the conductor 341, the conductor 342, the clutch solenoid 136, the conductor 343, the bridge 344 of the deenergized relay 345, the conductor 346, the bridge 347 of the relay 340 if this relay is energized, the conductor 348, the switch 251 with no article thereat, the conductor 350, the conductor 351, the bridge 352 of the switch 353, the conductor 354 and the conductor 303.

When the shaft 117 in its cycle closes the cam switch 471, the coil of the relay 345 is momentarily energized, and the solenoid 136 has its supply circuit open at the bridge 344 of the relay 345. The holding circuit for the relay 345 by the conductor 473, the bridge 478 of the relay 345, the conductor 480, the conductor 475, the bridge 479 and the conductor 437 is open at the sensor switch 251. The holding circuit for the relay 345 is also open when the relay 340 is energized by the conductor 242, the bridge 478, the conductor 480, the conductor 475, and the open bridge 347 of the energized relay 340.

As long as the switch 321 is open, its bridge 384 holds the conductor 383 open and without charge so the path by the bridge 382 of the switch 353 and the conductor 381 is broken and no current flows in the conductor 378 with the relay 340 dennergized. The relay 375 is thus deenergized and its bridge 390 opens so flow by conductors 378 and 391 also stops, and there is no flow to the hopper motor 72 and the hopper solenoid clutch 83 with no article feeding occurring or being attempted.

The time delay relay 440 is deenergized because the return path by the conductors 442 and 437 is broken at the sensor switch 251.

The wetting relay 486 is deenergized because its conductor 453 is opened at the bridge 452 of the energized relay 340 and the branch from conductor 453 through the bridge 450 of the relay 440 and by the conductors 442 and 437 is open at both the bridge 450 and the sensor switch 251.

The hopper pulsation relay 435 is deenergized because its return conductor 482 is disconnected at the bridge 483 of the deenergized relay 345.

Thus, the label feeding parts including the cyclic shaft 117 perform continuous cycles. If a label sheet is now placed in the machine, the sheet is advanced step-by-step until a "proper" label comes to the contact electrodes or contactors 146 and the sensor unit 331 causes the relay 340 to be deenergized so that path (2) is broken. If the sheet has one or more "improper" labels at its leading end, these are advanced and discarded. The machine may then be switched to fully automatic operation by merely closing the switch 321 by movement to the right to the position illustrated in the circuit diagram.

The circuit system of the labelling machine 10 also includes means for bypassing the hopper pulsating relay 435 by closing a switch 520 whereupon the continuous feeding of articles taken place in the absence of energization and deenergization of the sealing 83 during each cycle by a path:

(24) The conductor 302, the connector 396, the conductor 397, closed switch 398, the hopper motor 72 and the solenoid 83 in parallel, the conductor 430, the conductor 431 the closed bridge 432 of energized relay 365, conductor 433, a conductor 521, the closed hopper pulsating switch 520, a conductor 522, the conductor 374, the coil of relay 375, the conductor 373, the pilot lamp 324, the conductor 325, closed bridge 326 of hopper feed switch 321, the conductor 327 and the conductor 303. Under nonpulsating feed the articles closely follow one another and double feeding may occur. However, upon pulsating feed of the articles i.e., the solenoid 83 and motor 72 deenergized during each cycle, a bottom most article A is fed a sufficient distance to be advanced by the feed means 160 while a next adjacent article is rendered motionless by the deenergization of the motor 72 and the belts drawn thereby, thus preventing double feed of the articles.

From the foregoing, it will be seen that novel and advantageous provisions have been made by carrying out the desired end. However, attention is again directed to the fact that additional variations may be made in this invention without departing from the spirit and scope thereof.

I claim:

1. A machine of the class described comprising first feed means for feeding first articles along a first predetermined path, second feed means for feeding second articles along a second predetermined path, said first and second paths including a common path zone, detecting means along said second predetermined path, a circuit system connected to said detecting means, said circuit system including first circuit means responsive to a first condition detected by said detecting means for actuating said first and second feed means providing for continuous advancement of said first and second articles toward said common path zone, second circuit means of said circuit system responsive to a second condition detected by said detecting means for arresting the operation of said first feed means and continuing the feeding of the second articles by the second feed means, and third circuit means of said circuit system responsive to a third condition detected by said detecting means for re-establishing the feeding of the first articles by said first feed means.

2. A machine of the class described comprising first feed means for feeding first articles along a first predetermined path, second feed means for feeding second articles along a second predetermined path, said first and second paths including a common path zone, detecting means along said second predetermined path, a circuit system connected to said detecting means, said circuit system including first circuit means responsive to a first condition detected by said detecting means for actuating said first and second feed means providing for continuous advancement of said first and second articles toward said common path zone, second circuit means of said circuit system responsive to a second condition detected by said detecting means for interrupting the feeding of the first articles by said first feed means and continuing the feeding of the second articles by the second feed means, third circuit means of said circuit system responsive to a third condition detected by said detecting means for re-establishing the feeding of the first articles by said first feed means, and fourth circuit means of said circuit system responsive to a fourth condition detected by said detecting means for stopping both said first and second feed means.

3. A machine of the class described comprising first feed means for feeding first articles along a first predetermined path, second feed means for feeding second articles along a second predetermined path, said first and second paths including a common path zone, means at said common zone for uniting first article and second articles from the first and second paths respectively and discharging a second article in the absence of a first article, detecting means along said second path, a circuit system connected to said detecting means, said circuit system including first circuit means responsive to a first condition detected by said detecting means providing for continuous feeding both said first and second articles by said respective first and second feed means, said uniting and discharging means being operative during said continuous feeding to unite respective ones of said first and second articles, second circuit means of said circuit system responsive to a second condition detected by said detecting means for arresting the operation of said first feed means and continuing the feeding of said second articles, said uniting and discharging means being operative during the activation of said second circuit means to discharge a respective one of said second articles, third circuit means of said circuit system responsive to a third condition detected by said detecting means for re-establishing the feeding of the first articles by said first feed means, said uniting and discharging means being again operative during the activation of said third circuit means to unite respective ones of said first and second article.

4. A machine of the class described comprising first feed means for feeding first articles along a first predetermined path, second feed means for feeding second articles along a second predetermined path, said first and second paths including a common path zone, means at said common zone for uniting first article and second articles from the first and second paths respectively and discharging a second article in the absence of a first article, detecting means along said second path, a circuit system connected to said detecting means, said circuit system including first circuit means responsive to a first condition detected by said detecting means providing for continuous feeding of both said first and second articles by said respective first and second feed means, said uniting and discharging means being operative during said continuous feeding to unite respective ones of said first and second articles, second circuit means of said circuit system responsive to a second condition detected by said detecting means for interrupting the feeding of first articles by said first feed means and continuing the feeding of said second articles, said uniting and discharging means being operative during the activation of said second circuit means to discharge a respective one of said second articles, third circuit means of said circuit system responsive to a third condition detected by said detecting means for re-establishing the feeding of the first articles by said first feed means, said uniting and discharging means being again operative during the activation of said third circuit means to unite respective ones of said first and second article, and fourth circuit means of said circuit system responsive to a fourth condition detected by said detecting means for stopping both said first and second feed means.

5. A machine of the class described comprising first feed means for feeding first articles along a first predetermined path, first means for detecting first articles fed along said first path, second feed means for feeding second articles along a second predetermined path, second means for detecting second articles fed along said second path, said first and second paths generally uniting at a zone beyond said respective first and second detecting means, means adjacent said zone for uniting first and second articles and discharging a second article in the absence of a first article, said first and second detecting means forming a portion of a circuit system, said circuit system including first circuit means responsive to a first condition detected by said second detecting means for activating said first feed means to feed at least one of the first articles toward said zone, second circuit means responsive to an article detected by said first detecting means for activating said second feed means to feed at least one of the second articles toward said zone, said uniting and discharging means being operative to unite said fed articles at said zone, third circuit means responsive to a second condition detected by said second detecting means for interrupting the feeding of the first articles by said first feed means and continuing the feeding of the second articles by said second feed means, said uniting and discharging means being operative during the activation of said third circuit means to discharge a respective one of said second articles, and fourth circuit means responsive to a third condition detected by said second detecting means for deactivating both said first and second feed means.

6. A machine of the class described comprising first feed means for feeding first articles along a first predetermined path, first means for detecting first articles fed along said first path, second feed means for feeding second articles along a second predetermined path, second means for detecting second articles fed along said second path, said first and second paths generally uniting at a zone beyond said respective first and second detecting means, means adjacent said zone for uniting first and second articles and discharging a second article in the absence of a first article, said first and second detecting means forming a portion of a circuit system, said circuit system including first circuit means responsive to a first condition detected by said second detecting means for activating said first feed means to feed at least one of the first articles toward said zone, second circuit means responsive to an article detected by said first detecting means for activating said second feed means to feed at least one of the second articles toward said zone, said uniting and discharging means being operative to unite said fed articles at said zone, third circuit means responsive to a second condition detected by said second detecting means for arresting the operation of said first feed means and continuing the feeding of the second articles by said second feed means, said uniting and discharging means being operative during the activation of said third circuit means to discharge a respective one of said second articles, and fourth circuit means responsive to a third condition detected by said second detecting means for reactivating the feeding of first articles by said first feed means, said uniting and discharging means being again operative during the activation of said third circuit means to unite respective ones of said first and second articles.

7. A machine of the class described comprising first feed means for feeding first articles along a first predetermined path, first means for detecting first articles fed along said first path, second feed means for feeding second articles along a second predetermined path, second means for detecting second articles fed along said second path, said first and second paths generally uniting at a zone beyond said respective first and second detecting means, moisture applying means between a predetermined one of said detecting means and said zone for applying moisture to the articles fed by one of said first and second feeding means, means adjacent said zone for uniting first and second articles and discharging a second article in the absence of a first article, said first and second detecting means forming a portion of a circuit system, said circuit system including first circuit means responsive to a first condition detected by one of said first and second detecting means for actuating said first and second feeding means to feed first and second articles toward said zone, second circuit means responsive to condition detected by one of said first and second detecting means for actuating said mositure applying means to apply moisture to a predetermined area of one of said first and second articles, said uniting and discharging means being operative upon the first detected condition to unit said first and second means at said predetermined area, and third circuit means responsive to another condition detected by said second detecting means for terminating the operation of said first feed means and discharging a second article at said zone in the absence of a first article.

8. The machine as defined in claim 7 including severing means at said zone for severing individual second articles from a plurality of attached second articles.

9. A machine of the class described for uniting first articles and second articles comprising first and second feeding means for feeding first and second articles along respective first and second paths toward a common zone, first and second detecting means along said respective first and second paths, moisture applying means between said first detecting means and said common zone for applying moisture to a predetermined area of the first articles, means at said common zone for severing individual second articles from a plurality of attached second articles and applying an individual second article to a first article at said common zone and discharging an individual second article in the absence of a first article at said zone, said detecting means forming a portion of a circuit system, said circuit system including first circuit means responsive to a first condition detected by said second detecting means for actuating said first and second feeding means, second circuit means for deactivating said first feed means and continuing the activation of said second feeding means whereby first article feeding is terminated and second articles are discharged by said uniting and discharging means, and third circuit means for deactivating said second feed means and continuing the activation of said first feeding means whereby second article feeding is terminated and first articles are fed by said first feed means.

10. A machine of the class described for uniting first articles and second articles comprising first and second feeding means for feeding first and second articles along respective first and second paths toward a common zone, first and second detecting means along said respective first and second paths, moisture applying means between said first detecting means and said common zone for applying moisture to a predetermined area of the first articles, means at said common zone for severing individual second articles from a plurality of attached second articles and applying an individual second article to a first article at said common zone and discharging an individual second article in the absence of a first article at said zone, said detecting means forming a portion of a circuit system, said circuit system including circuit means responsive to a first condition detected by said second detecting means for actuating said first and second feeding means to advance first and second articles to said common zone, another circuit means of said system responsive to the detection of a first article by said first detecting means for applying moisture to a predetermined area of said first articles, said severing and uniting means being operative in response to the first detected condition for severing second articles and uniting the severed second articles to the moistened areas of the first articles, further circuit means responsive to a second condition detected by said second detecting means for deactivating said first feeding means, said uniting and discharging means being operative in response to said second condition for severing and discharging at least a single second article, and additional circuit means responsive to a third condition detected by said second detecting means for deactivating both said first and second feeding means.

11. The machine as defined in claim 10 including circuit means responsive to said second and third conditions for deactivating said moisture applying means.

References Cited

UNITED STATES PATENTS

| | | | |
|---|---|---|---|
| 2,936,815 | 5/1960 | Schjeldahl et al. | 156—510X |
| 3,010,864 | 11/1961 | Schneider et al. | 156—363 |
| 3,026,236 | 3/1962 | Hein et al. | 156—355 |
| 3,193,430 | 7/1965 | Messmer et al. | 156—355 |
| 3,274,043 | 9/1966 | Scheider et al. | 156—357 |

JOHN T. GOOLKASIAN, Primary Examiner

D. J. FRITSCH, Assistant Examiner

U.S. Cl. X.R.

156—352, 354, 355, 357, 364, 528, 566, 570